United States Patent
Kimmet

(10) Patent No.: US 11,652,758 B2
(45) Date of Patent: May 16, 2023

(54) RESERVATION OF RESOURCES AND DEPLOYMENT OF APPLICATIONS USING AN INTEGRATED DEVELOPMENT ENVIRONMENT

(71) Applicant: eBay Inc., San Jose, CA (US)

(72) Inventor: Timothy Gordon Kimmet, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/235,545

(22) Filed: Apr. 20, 2021

(65) Prior Publication Data

US 2021/0288919 A1 Sep. 16, 2021

Related U.S. Application Data

(63) Continuation of application No. 16/734,764, filed on Jan. 6, 2020, now Pat. No. 10,999,218, which is a (Continued)

(51) Int. Cl.
*G06F 3/048* (2013.01)
*H04L 47/70* (2022.01)
(Continued)

(52) U.S. Cl.
CPC .......... *H04L 47/827* (2013.01); *G06F 3/0481* (2013.01); *G06F 3/04842* (2013.01);
(Continued)

(58) Field of Classification Search
CPC ....... H04L 47/827; H04L 41/22; H04L 43/08; H04L 47/829; H04L 67/10; G06F 3/0481;
(Continued)

(56) References Cited

U.S. PATENT DOCUMENTS 7,552,450 B1 6/2009 Evans et al.
7,793,087 B2 9/2010 Zenz et al.
(Continued)

OTHER PUBLICATIONS

Visual Studio 2005: Development and Operations in Whitehorse, Microsoft Docs, Retrieved from the Internet URL: https://docs.microsoft.com/en-us/archive/msdn-magazine/2004/july/visual-studio-2005-development-and-operations-in-whitehorse, Jul. 2004, 12 pages.
(Continued)

*Primary Examiner* — David Phantana-angkool
(74) *Attorney, Agent, or Firm* — Schwegman Lundberg & Woessner, P.A.

(57) ABSTRACT

Systems and methods to reserve resources is provided. In exemplary embodiments, a selection of a profile from a user is received. A dynamic graphical user interface is generated, using one or more processors. The dynamic graphical user interface allows the user to configure a topology based on the selected profile. The dynamic graphical user interface provides input fields in which the user may select a resource. An indication of the selected applicable topology property for configuring the topology is received. A topology is automatically generating based in part on the selected applicable topology property.

20 Claims, 7 Drawing Sheets

Related U.S. Application Data continuation of application No. 16/021,756, filed on Jun. 28, 2018, now Pat. No. 10,560,398, which is a continuation of application No. 15/051,238, filed on Feb. 23, 2016, now Pat. No. 10,044,639, which is a continuation of application No. 13/931,389, filed on Jun. 28, 2013, now Pat. No. 9,282,009, which is a continuation of application No. 12/855,650, filed on Aug. 12, 2010, now Pat. No. 8,479,098, and a continuation of application No. 12/855,644, filed on Aug. 12, 2010, now Pat. No. 8,635,534.

(60) Provisional application No. 61/233,425, filed on Aug. 12, 2009.

(51) Int. Cl.

| | |
|---|---|
| *G06F 8/61* | (2018.01) |
| *G06F 9/445* | (2018.01) |
| *G06F 9/50* | (2006.01) |
| *H04L 41/22* | (2022.01) |
| *G06F 3/0481* | (2022.01) |
| *G06F 3/04842* | (2022.01) |
| *G06F 3/04847* | (2022.01) |
| *G06F 8/60* | (2018.01) |
| *G06T 11/20* | (2006.01) |
| *H04L 43/08* | (2022.01) |
| *H04L 67/10* | (2022.01) |

(52) U.S. Cl.
CPC ............ *G06F 3/04847* (2013.01); *G06F 8/60* (2013.01); *G06F 8/61* (2013.01); *G06F 9/44505* (2013.01); *G06F 9/5072* (2013.01); *G06T 11/206* (2013.01); *H04L 41/22* (2013.01); *H04L 43/08* (2013.01); *H04L 47/829* (2013.01); *H04L 67/10* (2013.01)

(58) Field of Classification Search
CPC .... G06F 3/04842; G06F 3/04847; G06F 8/60; G06F 8/61; G06F 9/44505; G06F 9/5072; G06T 11/206
See application file for complete search history.

(56) References Cited

U.S. PATENT DOCUMENTS

| | | | |
|---|---|---|---|
| 7,797,368 B1 * | 9/2010 | Gadkari | G06F 9/5066 709/224 |
| 7,954,087 B2 | 5/2011 | Zenz et al. | |
| 7,987,234 B1 * | 7/2011 | Waldorf | G06T 11/206 709/204 |
| 8,086,436 B2 | 12/2011 | Chancey et al. | |
| 8,135,659 B2 | 3/2012 | Gaffga et al. | |
| 8,140,624 B2 * | 3/2012 | Gingell | G06F 8/63 709/201 |
| 8,140,644 B2 | 3/2012 | Hagale et al. | |
| 8,214,905 B1 | 7/2012 | Doukhvalov et al. | |
| 8,230,426 B2 | 7/2012 | Powers et al. | |
| 8,250,535 B2 | 8/2012 | Groves et al. | |
| 8,255,429 B2 | 8/2012 | Lange et al. | |
| 8,255,496 B2 | 8/2012 | Shukla et al. | |
| 8,270,313 B2 | 9/2012 | Tao et al. | |
| 8,352,866 B2 | 1/2013 | Bethune et al. | |
| 8,479,098 B2 | 7/2013 | Kimmet | |
| 8,635,534 B2 | 1/2014 | Kimmet | |
| 8,805,966 B2 | 8/2014 | Raciborski et al. | |
| 8,850,130 B1 | 9/2014 | Aron et al. | |
| 8,856,295 B2 | 10/2014 | Aliminati | |
| 9,077,613 B2 | 7/2015 | Deng et al. | |
| 9,152,470 B2 | 10/2015 | Eksten et al. | |
| 9,282,009 B2 | 3/2016 | Kimmet | |
| 9,804,901 B2 | 10/2017 | Gambardella et al. | |
| 9,882,793 B2 * | 1/2018 | Broda | H04L 41/22 |
| 9,923,911 B2 | 3/2018 | Vasseur et al. | |
| 10,044,639 B2 | 8/2018 | Kimmet | |
| 10,055,184 B1 | 8/2018 | Ferrell et al. | |
| 10,176,015 B2 * | 1/2019 | Li | G06F 9/50 |
| 10,320,709 B2 | 6/2019 | Jaisinghani | |
| 10,560,398 B2 | 2/2020 | Kimmet | |
| 10,877,795 B2 * | 12/2020 | Potharaju | G06F 9/50 |
| 10,999,218 B2 | 5/2021 | Kimmet | |
| 2003/0225867 A1 | 12/2003 | Wedlake | |
| 2006/0041644 A1 * | 2/2006 | Henseler | G06F 9/54 709/220 |
| 2006/0075079 A1 * | 4/2006 | Powers | H04L 67/10 709/220 |
| 2006/0075407 A1 * | 4/2006 | Powers | H04L 67/125 718/100 |
| 2006/0075408 A1 * | 4/2006 | Powers | G06F 9/5072 718/100 |
| 2006/0080389 A1 * | 4/2006 | Powers | H04L 67/125 709/203 |
| 2006/0200494 A1 | 9/2006 | Sparks | |
| 2007/0169049 A1 | 7/2007 | Gingell et al. | |
| 2010/0088150 A1 | 4/2010 | Mazhar et al. | |
| 2011/0041066 A1 * | 2/2011 | Kimmet | H04L 41/22 715/736 |
| 2011/0055707 A1 | 3/2011 | Kimmet | |
| 2011/0145789 A1 | 6/2011 | Rasch et al. | |
| 2012/0089960 A1 | 4/2012 | Medvidovic et al. | |
| 2012/0101749 A1 | 4/2012 | Garrett et al. | |
| 2012/0124553 A1 | 5/2012 | Eschenroeder et al. | |
| 2012/0246310 A1 * | 9/2012 | Broda | H04L 61/4511 709/224 |
| 2012/0272285 A1 | 10/2012 | Brooks et al. | |
| 2013/0055091 A1 | 2/2013 | Dutta et al. | |
| 2013/0179876 A1 | 7/2013 | Aliminati | |
| 2013/0290853 A1 | 10/2013 | Kimmet | |
| 2014/0279903 A1 | 9/2014 | Hsiao et al. | |
| 2016/0173412 A1 | 6/2016 | Kimmet | |
| 2016/0216875 A1 | 7/2016 | Soo et al. | |
| 2016/0366246 A1 * | 12/2016 | Battle | G06F 9/5055 |
| 2017/0004018 A1 | 1/2017 | Mangtani et al. | |
| 2017/0090984 A1 * | 3/2017 | Li | G06F 11/323 |
| 2017/0371721 A1 * | 12/2017 | Yu | G06F 9/52 |
| 2018/0309695 A1 | 10/2018 | Kimmet | |
| 2019/0213041 A1 * | 7/2019 | Li | G06F 11/323 |
| 2020/0034185 A1 * | 1/2020 | Potharaju | G06F 9/46 |
| 2020/0195578 A1 | 6/2020 | Kimmet | |
| 2021/0288919 A1 * | 9/2021 | Kimmet | G06F 9/5072 |
| 2021/0326179 A1 * | 10/2021 | Li | G06F 11/323 |

OTHER PUBLICATIONS

Advisory Action received for U.S. Appl. No. 12/855,644, dated Aug. 14, 2013, 3 pages.
Final Office Action received for U.S. Appl. No. 12/855,644, dated May 23, 2013, 8 pages.
Non-Final Office Action received for U.S. Appl. No. 12/855,644, dated Jun. 22, 2012, 7 pages.
Notice of Allowance received for U.S. Appl. No. 12/855,644, dated Sep. 18, 2013, 7 pages.
Non-Final Office Action received for U.S. Appl. No. 12/855,650, dated May 11, 2012, 7 pages.
Non-Final Office Action received for U.S. Appl. No. 12/855,650, dated Nov. 23, 2012, 6 pages.
Notice of Allowance received for U.S. Appl. No. 12/855,650, dated Mar. 4, 2013, 6 pages.
Non-Final Office Action received for U.S. Appl. No. 13/931,389, dated Jul. 14, 2015, 7 pages.
Notice of Allowance received for U.S. Appl. No. 13/931,389, dated Nov. 13, 2015, 5 pages.
Notice of Allowance received for U.S. Appl. No. 15/051,238, dated Jun. 6, 2018, 11 pages.
Pre-Interview Communication received for U.S. Appl. No. 15/051,238, dated Jan. 8, 2018, 4 pages.
Notice Of Allowance received for U.S. Appl. No. 16/021,756, dated Sep. 25, 2019, 7 pages.

(56) References Cited

OTHER PUBLICATIONS

Non Final Office Action Received for U.S. Appl. No. 16/734,764 dated Aug. 6, 2020, 8 pages.

Notice of Allowance Received for U.S. Appl. No. 16/734,764, dated Jan. 7, 2021, 6 Pages.

Fredrick et al., "Build and Deployment Automation for the Lean Economy", UrbanCode, Improving Efficiency by Removing Waste, Retrieved from the Internet URL: http://download.101com.com/pub/adtmag/FilesUrbancode_Lean_Build_and_Deployment_Automation.pdf, 2009, 13 pages.

Minick,"AnthillPro 3.6: Automation for Build, Deploy, Test and Release", DevOps Zone, Retrieved from the Internet URL: https://dzone.com/articles/anthillpro-36-automation-build, Jan. 23, 2009, 3 pages.

U.S. Appl. No. 61/230,584, "Management of Services And Resources", filed Jul. 31, 2009, 38 Pages.

* cited by examiner

Set topology properties

This page allows the users to setup topology properties for the Cloud project — 502

Topo Name: [My Topology]

☑ Use CAL

☑ Use Db
- Database Name: [User]
- Account User Name: [Bw_test_app]   Account Password: [**********]
- Database SQL script: [http://ph.i.v..app104.eva.com.0062/nexus/content/rep]

JVM: [Sun 1.6.0]

Servlet Container [Tomcat 6.0]

Number of Servers [2]

☑ Display App   App Repository URL: [http://ph.i.v..app104.eva.com.0062/nexus/content/]

[<Back] [Next>] [Finish] [Cancel]

FIG. 5

RESERVATION OF RESOURCES AND DEPLOYMENT OF APPLICATIONS USING AN INTEGRATED DEVELOPMENT ENVIRONMENT

PRIORITY

This application is a continuation of U.S. patent application Ser. No. 16/734,764, filed Jan. 6, 2020, which is a continuation of U.S. patent application Ser. No. 16/021,756, filed Jun. 28, 2018, which is a continuation of U.S. patent application Ser. No. 15/051,238, filed Feb. 23, 2016, now issued as U.S. Pat. No. 10,044,639, which is a continuation of U.S. patent application Ser. No. 13/931,389, filed on Jun. 28, 2013, now issued as U.S. Pat. No. 9,282,009, which is a continuation of U.S. patent application Ser. No. 12/855,650, filed Aug. 12, 2010, now issued as U.S. Pat. No. 8,479,098, which is related to U.S. patent application Ser. No. 12/855,644, filed on Aug. 12, 2010, now issued as U.S. Pat. No. 8,635,534, which claims the benefit of U.S. Provisional Patent Application Ser. No. 61/233,425, filed on Aug. 12, 2009, the benefit of priority of each of which is claimed hereby, and each of which are incorporated by reference herein in their entirety.

FIELD

The present disclosure relates generally to networking, and in a specific example embodiment, to reservations of resources and deployment of applications in a network.

BACKGROUND

Cloud computing is a form of distributed computing in which computing resources are provided as a service over a network. In particular, a cloud is a computing architecture characterized by a number of interconnected machines (e.g., computing devices such as personal computers, servers, routers, and load balancers). Conventionally, resource allocation in a cloud computing environment is based on types of architecture specific to particular models. That is, the architectures are typically hardcoded to specific models or plans. While this hardcoding provides a simple mechanism for reserving allocated resources, it does not allow any flexibility in the system. Additionally, more complex allocation schemes (e.g., pool creation) may take an extraordinary amount of time (e.g. two months) and a large amount of trace tickets (e.g., 100 trace tickets). Thus, resource allocation using conventional systems is time consuming and requires a significant investment in human resources.

BRIEF DESCRIPTION OF THE DRAWINGS

Various ones of the appended drawings merely illustrate example embodiments of the present invention and cannot be considered as limiting its scope.

FIG. 5 is an example of a portion of a graphical user interface for setting topology properties.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a specific network-based environment, the embodiments are given merely for clarity in disclosure. Thus, any type of electronic commerce or electronic business systems, including various system architectures, may employ various embodiments of the management system described herein and is considered as being within a scope of example embodiments. Each of a variety of example embodiments is discussed in detail, below.

Embodiments of the present invention provide systems and methods to reserve resources in a network. In one embodiment, the network is a cloud environment. In exemplary embodiments, a selection of a profile related to a project is received from a user. The profile may be selected from a list of available profiles. A dynamic graphical user interface is generated, using one or more processors. The dynamic graphical user interface allows the user to configure a topology based on the selected profile. The graphical user interface provides input fields in which the user may select an applicable topology property. An indication of the selected applicable topology property for configuring the topology is received. The topology may be automatically generated based in part on a submission of the selected applicable topology property.

Figure 1:
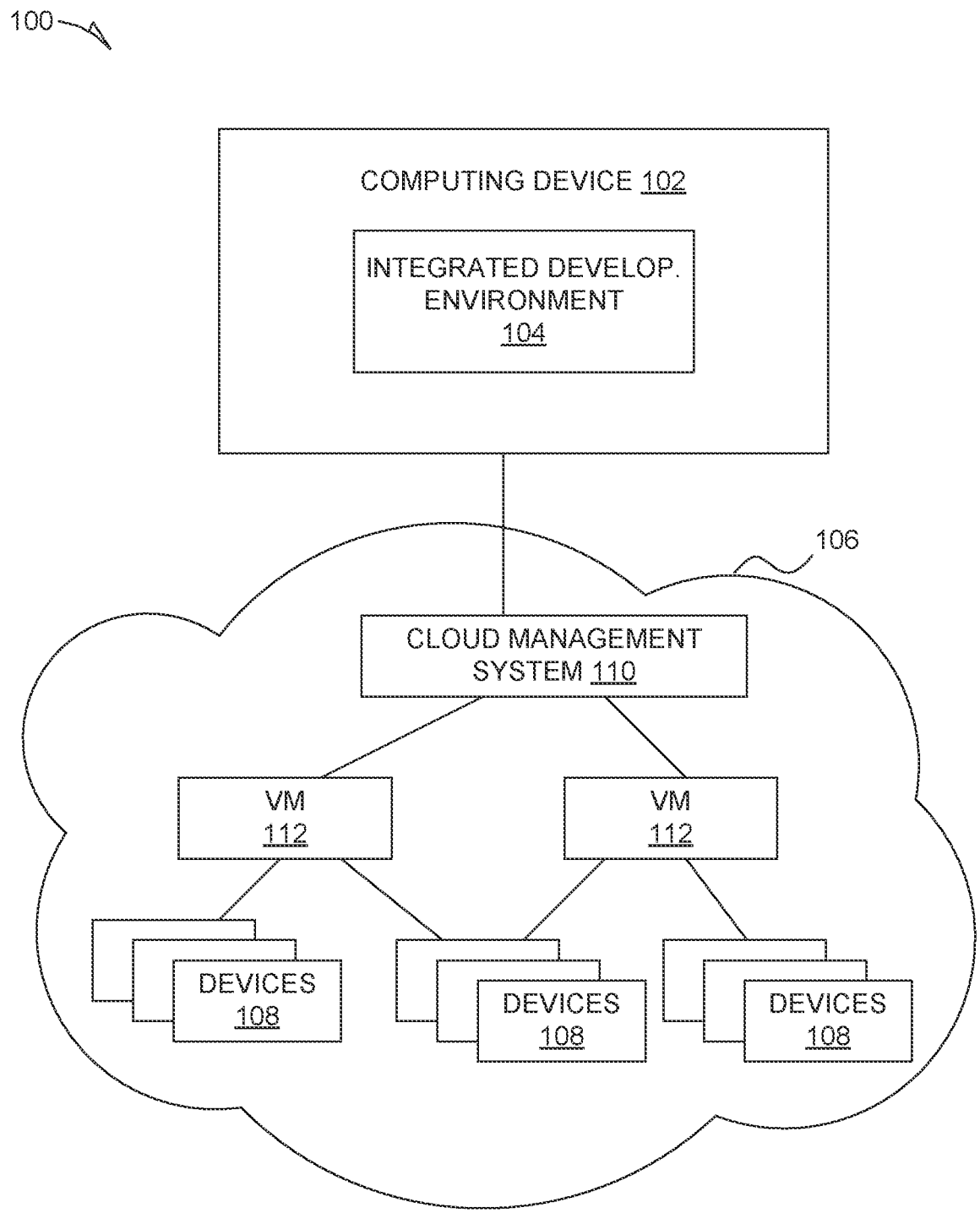
FIG. 1 is a block diagram illustrating an example of an environment in which example embodiments may be deployed.

With reference to FIG. 1, an embodiment of a cloud computing environment 100 in which example embodiments of the present invention may be deployed is shown. The cloud computing environment 100 depicts a computing device 102 configured to host an integrated development environment 104. The computing device 102 is communicatively coupled to one or more clouds 106. For example, the computing device 102 may be coupled via a network (e.g., WAN, LAN, Internet) to the cloud 106. It is noted that while example embodiments discuss cloud computing, embodiments of the present invention may applied to any type of computing environment.

The cloud 106 may comprise a plurality of devices 108 or components (collectively referred to as resources) such as, for example, one or more of a server, pool, service, complete site, or any other components or collection of components that may be reserved and monitored by the computing device 102. In some embodiments, the cloud 106 may further comprise a cloud management system 110 that dynamically manages resources and deploys applications within the cloud 106. In one embodiment, the cloud management system 110 may be embodied within the computing device 102. The cloud may also comprise one or more virtual machines 112.

In example embodiments, the integrated development environment 104 provides tools for software development in a variety of different programming languages, such as JAVA, C++, and JavaScript. Examples of tools include source code editors, compilers, interpreters, build automation tools, and debuggers. Additionally, in accordance with embodiments of the present invention, the integrated development environment 104 may facilitate virtualization of an application across the cloud 106. In particular, the integrated development environment 104 can accept and accommodate plug-in tools that facilitate the deployment of applications in the cloud computing environment 100. For example, a user can develop an application (e.g., project) using the integrated development environment 104. After the application is developed, the integrated development environment 104 facilitates reservation of resources in the cloud 106 for the deployment of the application. For example, a number of devices 108 may be reserved to execute the application. As discussed further below, the integrated development environment 104 further provides dynamically generated graphically user interfaces (GUIs) to develop the application, initiate reservation of the resources, and monitor deployment of the application.

Figure 2:
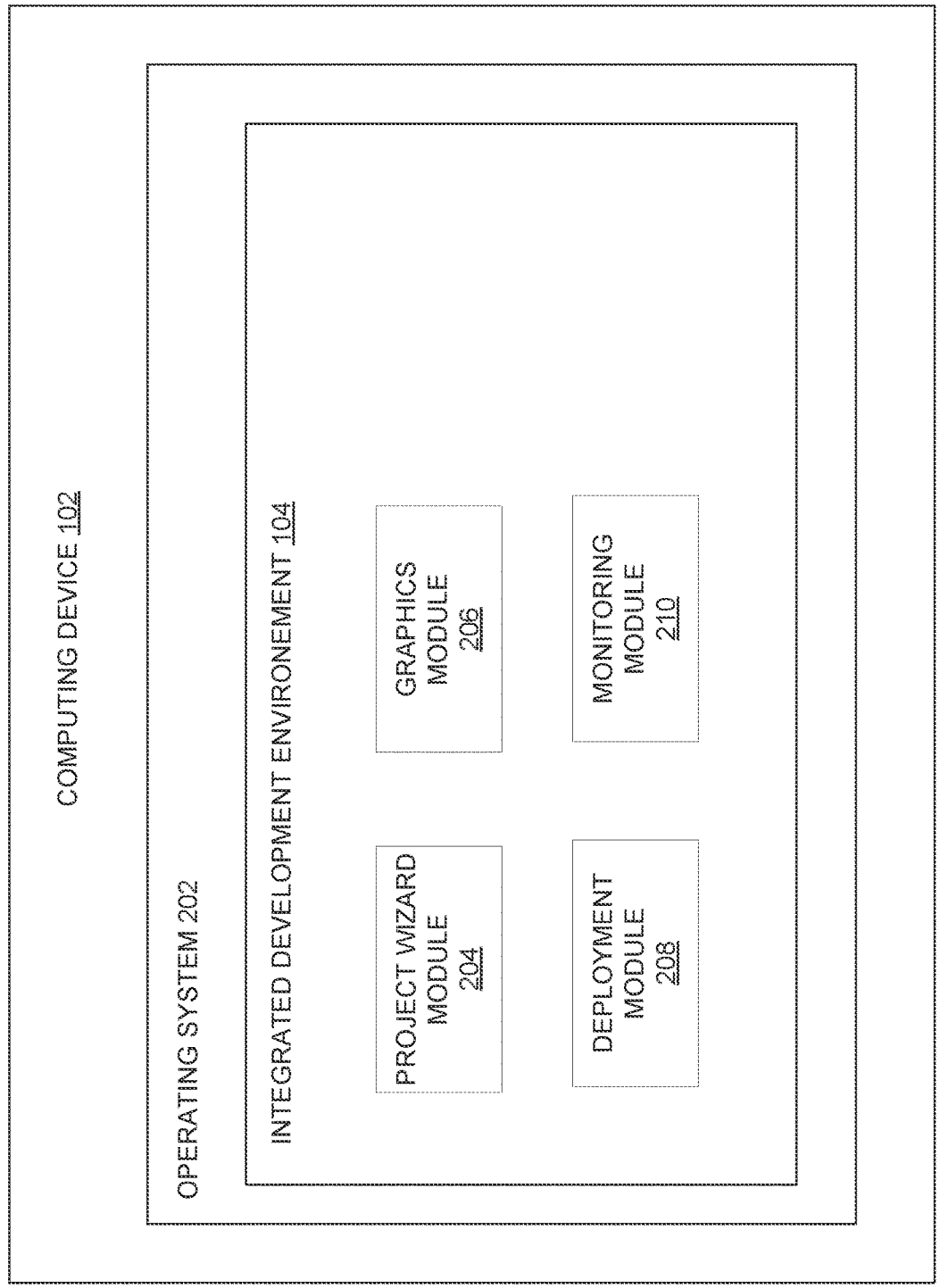
FIG. 2 is a block diagram illustrating an example embodiment of a computing device.

FIG. 2 is a block diagram illustrating an example embodiment of the computing system 102. The computing device 102 may be deployed using, for example, a personal computer, a laptop computer, a server computer, a tablet personal computer, or any other type of computing device. The computing device 102 may be used to implement computer programs, logic, applications, methods, processes, or software that, in turn, develop applications, reserve resources, deploy the applications, and monitor the deployment as is described in more detail below.

In example embodiments, the computing device 102 executes an operating system 202 that manages the hardware on the computing device 102 to execute processes or services. These processes or services include the integrated development environment 104. The integrated development environment 104 may comprise or access a variety of different applications and plug-ins. In one embodiment, the integrated development environment 104 comprises a project wizard module 204, a graphics module 206, a deployment module 208, and a monitoring module 210 communicatively coupled together. In some embodiments, the functions of one or more of the modules (e.g., the graphics module 206) may be incorporated into the project wizard module 204.

The project wizard module 204 allows a user to create a project or application, which may be deployed on the network or cloud. In accordance with one embodiment, the project wizard module 204 accesses information models, such as profiles (e.g., predefined templates of particular resources) in a configuration repository (not shown) based on the application the user desires to create. Profiles may span both infrastructure and platform. Each profile may be a generic specification for a project or application in a given architecture domain (e.g., V3, service oriented architecture (SOA), messaging) for providing a desired service. The profile may specify entities, resource types, or components that the project associated with the profile requires (e.g., application servers, switch, load balancer), the profile's cardinalities, configuration parameters, and inter-relationships. Thus, the profile indicates, generically, which resources or components, and connections made between those components, are used to implement a particular service (e.g., application).

The project wizard module 204 works in conjunction with the graphics module 206 to provide the user with dynamic GUIs that allow the user to create the project. When the user selects a profile for the project via the project wizard module 204, the graphics module 212 generates a dynamic GUI for configuring a topology based on the selected profile. Specifically, the dynamic GUI allows for selection of topology properties (e.g., resources) that will be used by the selected project once deployed. In some embodiments, some of the properties may be default or set by the project wizard module 204 based on the profile. The defaults may be changeable by the user. In other embodiments, the properties may be selected from a drop-down menu, a checkbox, or be manually entered by the user. Because the GUI is generated based on a specific profile and on applicable topology properties (which may change), the GUI is dynamic and may be different in each instantiation.

During the selection of topology properties (e.g., resources), a determination may be made whether a particular property or resource is applicable. In one embodiment, the project wizard module 204 may use a set of algorithms and policies that are applied prior to allowing selection of resource topology property. The policies may comprise a set of fault domain standards that apply to a selected topology property (e.g., machine). For instance, the fault domain standard may assure that if the particular resource fails, the failure will not affect an entire pool but only a limited number of resources. Other examples of policies include, for example, if the particular resource is a virtual machine, the virtual machine cannot be on the same DeX server or particular resources cannot be chosen if they are physically located on the same rack, chassis, power grid, or data center. Thus, the policies and fault domain standards operate to increase reliability for a project (e.g., application or service). It should be noted that a similar application of algorithms and policies may be utilized in reserving the individual or specific resources (e.g., the actual machine or device) that will be needed in deployment of the application.

In another example, the project may require a load balancer having high capacity. If a particular load balancer does not have enough capacity, the GUI provided by the graphics module 206 does not allow the user to select that load balancer. In some embodiments, the project wizard module 204, via the GUI, may dynamically determine and suggest other resources. Thus, the dynamic GUI limits the user to resources that are available, match the capabilities and requirements of the selected profile, and comply with policies (e.g., fault domain standards).

Once all the topology properties are selected and received by the project wizard module 204, a topology for the project is generated by the project wizard module 204. The topology is a realization of the profile which specifies actual resources and number of resources that are used to provide the service (e.g., the project). In various embodiments, the topology may be logical or physical. The logical topology specifies abstract resources (e.g., two servers, one switch, and one load balancer) while the physical topology specifies concrete resources (e.g., two LS20 servers, one Cisco 3550 switch, and one NetScaler load balancer). As such, the physical topology may ultimately be used for project deployment.

The topology represents a graph of resources and relationships between these resources. Each node in the topology represents a different phase in an implementation of the project described by the topology, and the orchestration of the topology is based on relationships between these nodes. When a topology is created, the topology represents the project and indicates the resources required to implement the project. The topology may not necessarily indicate the actual devices 108, but may leave the selection of the actual devices 108 to the cloud management system 110 or other provisioning system.

For example, a particular project for processing requests may require that a pool of devices 108 includes devices 108 located in multiple data centers that, in turn, have load balancers that are configured to load balance a request. Further, the request is serviced by some machine in the pool that is configured to access a database. The topology, in this example, represents a whole graph of these resources (e.g., machine, load balancer, database) and how these resources connect to each other.

The project wizard module 204 then reserves or provides instruction to other components (e.g., the cloud management system 110 or provisioning system) to reserve resources for the generated template. The reservation of resources may comprise identifying the individual resources (e.g., devices 108) that will be deployed by the application represented by the topology. In some embodiments, the reservation of resources may comprise a pre-provisioning of the individual resources.

The deployment module 208 (e.g., a cloud server module) deploys the application upon initiation by the user. For example, the deployment module 208 may create a Directed Acyclic Graph (DAG) or other types of graphs which specifies the tasks to be performed in order to deploy the application. The DAG is then traversed by the deployment module 208 in order to determine an order in which to execute nodes of the DAG (e.g., tasks) of the DAG. In some cases, the nodes of the DAG represent the reserved resources.

The DAG is generated based on the topology and rules accessed from a rules database. The rules may be based on observations. Relationships and dependencies between and within resources in the cloud computing environment 100 are based on standards (e.g., TCP/IP and other relevant standards) or are readily apparent. For example, a web application cannot be deployed without a server, or a load balancer cannot load balance if it does not have an IP address. Thus, parent-child relationships may exist (e.g., one thing needs to occur before another). All of these relationships can be used to create task precedence rules. As a result, the structure of the DAG or orchestration plan can be inferred from the topology based on these rules. By generating the DAG, individual orchestration plans do not need to be hard-coded resulting in significantly reduced development time and errors. Thus, the actual deployment of an application is conducted according to a graph traversal algorithm whereby an order to perform the nodes in the DAG is determined and executed. Upon completion of the execution of the nodes in the DAG, the application is fully deployed.

During deployment, the monitoring module 210 may monitor the progress of the deployment (e.g., execution of the nodes in the DAG) and instruct the graphics module 206 to illustrate the progress to the user. Specifically, a graphics module 206 generates a GUI illustrating the DAG for deployment of the application. A status indicator may also be associated with each node of the DAG such that the user may visually observe the progress of the execution of the node. Thus, the application deployment process is monitored in real-time by the monitoring module 210.

Figure 3:
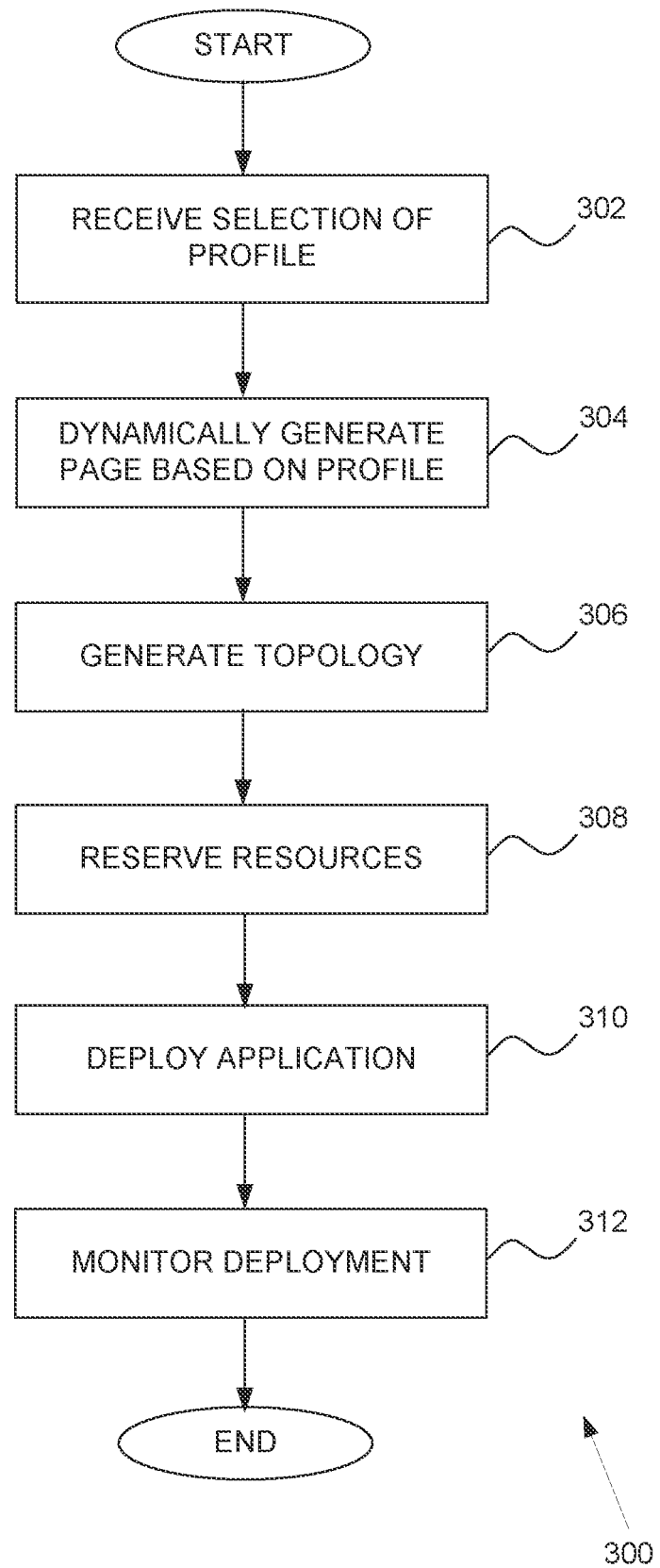
FIG. 3 is a flowchart of an example method for reserving resources and deployment of applications.

Referring now to FIG. 3, a flowchart of an example method 300 for reserving resources and deployment of an application in a cloud computing environment (e.g., cloud computing environment 100) is shown. In operation 302, a selection of a profile is received by the project wizard module 204. In some embodiments, a user associated with the computing device 102 logs into the integrated development environment 104 and verifies eligibility for creating a new cloud project (e.g., application). The user then selects a profile (e.g., project template). The user may also provide a name for the new project and a name for the topology that will be generated for the project. The profile is accessed by the project wizard module 204 for processing.

In operation 304, a topology property setup page (e.g., a GUI for configuring a topology based on the selected profile) is dynamically generated based on the selected profile. The graphics module 206 generates the setup page based on data received from the project wizard module 204 and provides the setup page to the user. The setup page may provide input fields (e.g., manual entry boxes, drop-down menus, checkboxes) that allow the user to configure properties of the project such that a customized topology can be created from the profile.

During the selection of topology properties (e.g., resources), a determination may be made whether a particular topology property (e.g., resource) is applicable based on algorithms and policies (e.g., a set of fault domain standards). If a particular topology property is not applicable or available, the GUI provided by the graphics module 206 does not allow the user to select that topology property. In some embodiments, the project wizard module 204 via the GUI may dynamically select or suggest other properties. Thus, the dynamic GUI may limit the user to properties that are available, match the capabilities and requirements of the selected profile, and comply with policies (e.g., fault domain standards). The selection of the resources effectively reserves the resources for deployment in accordance with one embodiment.

For example, the profile may specify that a load balancer, an application tier, and a database are required. The setup page allows the user to select a type of load balancer (e.g., NetScaler or F5), a type of login service (e.g., CAL), and database (e.g., MySql, Oracle) via input fields. Some of the input fields may be default, which can be changed by the user. Other input fields may require the user to select from a drop-down menu or manually enter a value.

Once the setup page is completed (e.g., all desired topology properties are inputted) and submitted, the customized topology is generated in operation 306. In example embodiments, the project wizard module 204 generates the topology. As discussed, the topology comprises a plan for deployment represented as a graph of resources and their relationships with each other.

In operation 308, resources corresponding to the generated topology are reserved. In example embodiments, the reservation of resources is performed upon the creation and saving of the topology. In one embodiment, the project wizard module 204 may reserve or provides instructions to other components (e.g., the cloud management system 110 or provisioning system) to reserve resources for the generated template. The reservation of resources may comprise, in one embodiment, identifying the individual and actual resources (e.g., devices 108) that will be deployed by the application represented by the topology. In some embodiments, the reservation of resources may comprise a pre-provisioning of the individual resources.

As a result, the reservation of resources facilitates reserving or accessing technology-enabled services via the integrate development environment 104 without, for example, knowledge of, expertise with, or control over the technology infrastructure that supports the application. For instance, the automation of the resource reservation may allow a user without detailed knowledge of the physical aspects of the cloud (e.g., Internet Protocol (IP) address) to reserve resources.

In operation 310, the application may be deployed. The deployment module 208 deploys the application upon receiving an indication from the user. For example, the deployment module 208 may create a Directed Acyclic Graph (DAG) which illustrates tasks that need to be performed in order to deploy the application. The DAG is then traversed in order to determine an order in which to execute nodes (e.g., tasks) of the DAG. The nodes are then executed in the determined order.

In one embodiment, the deployment module 208 may transmit a command to the cloud management system 110 to deploy the application. The deployment may be phased where, for example, the deployment module 208 may specify the deployment of a portion of the application. Alternatively, the deployment may be complete where, for example, deployment module 208 may specify the deployment of the complete application. Additionally, the deployment module 208 may also trigger a rollback (e.g., remove the deployed application from the cloud) of the deployed application.

During deployment, the progress of the deployment (e.g., execution of the nodes in the DAG) may be monitored in operation 312 by the monitor module 210. The monitor module 210 may instruct the graphics module 206 to illustrate the progress to the user. Specifically, the graphics module 206 generates a GUI illustrating the DAG for deployment of the application. A status indicator may also be associated with each node of the DA such that the user may visually observe the progress of the execution of the node. Thus, the application deployment process is monitored in real-time by the monitoring module 210. Thus, the application deployment process is monitored in real-time and provided graphically to the user.

Figure 4:
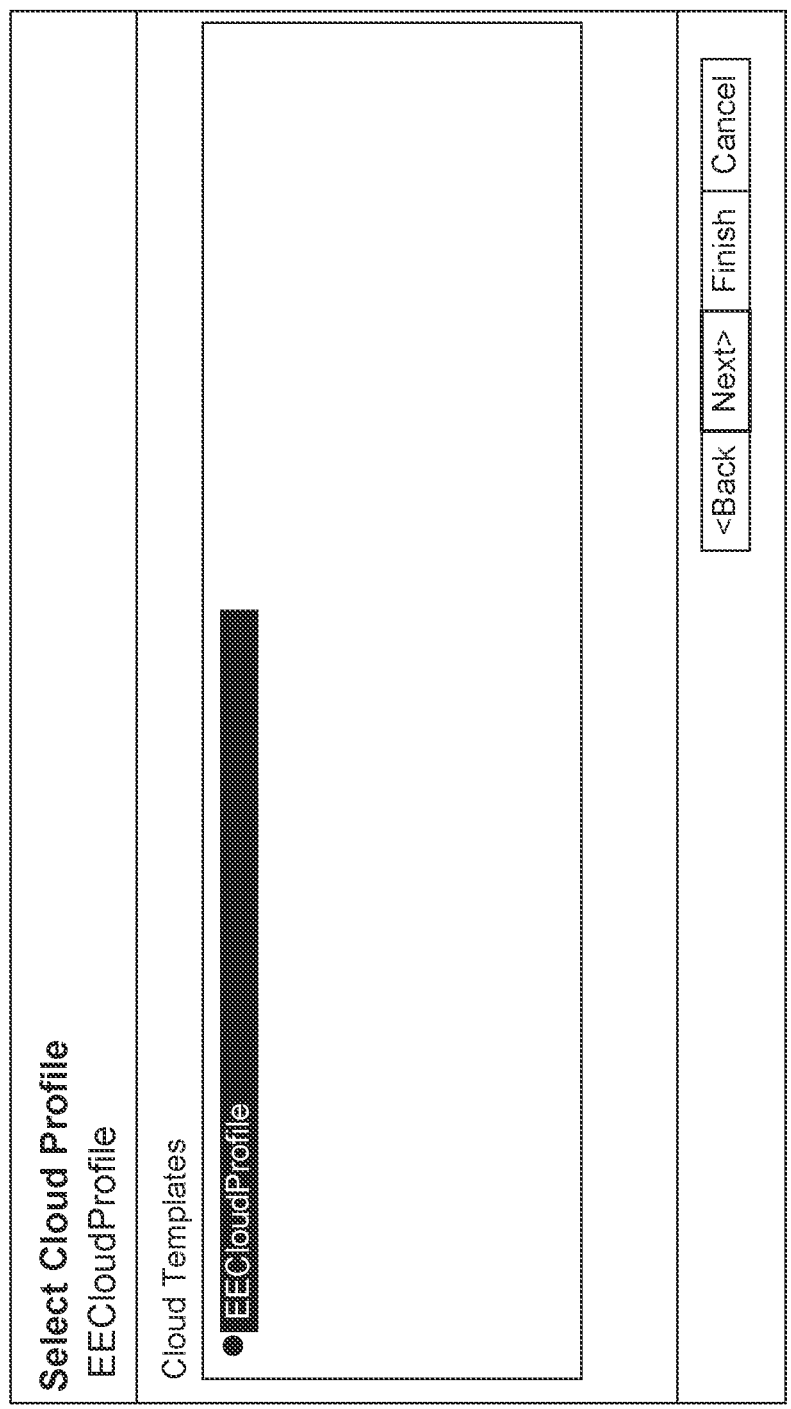
FIG. 4 is an example of a portion of a graphical user interface for selecting a profile.

FIG. 4 is an example of a portion of a graphical user interface for selecting a profile. In the example of FIG. 4, only a single profile is shown available for selection. However, alternative examples may comprise any number of profiles from which the user may select. Upon selection of profile, the user may be asked to name the new project and new topology (e.g., My Topology) if one is to be created.

FIG. 5 is an example of a portion of a graphical user interface for setting topology properties (e.g., selecting resources). Upon selection of the profile, the project wizard module 204 accesses the profile and uses the information for the profile to instruct the graphics module 212 to generate the graphical user interface. Thus, the graphical user interface is specific to the selected profile (e.g., input fields are customized based on the profile). Some of the input fields in the graphical user interface may be pre-populated or filled with a default value. For example, the topology name may be pre-populated with a name previously provided. Other input fields may be selected or populated by the user. For example, the user may decide to use a database, to use CAL as a login service, and to use Tomcat 6.0 of a servlet container.

It should be noted that not all input fields require an input. For example, if the user decides not to use a database, a database detail section 502 may be greyed out or the user is otherwise not able to provide any inputs into the database detail section 502. Once the topology properties are selected and submitted, the topology is generated and the resources reserved.

Figure 6:
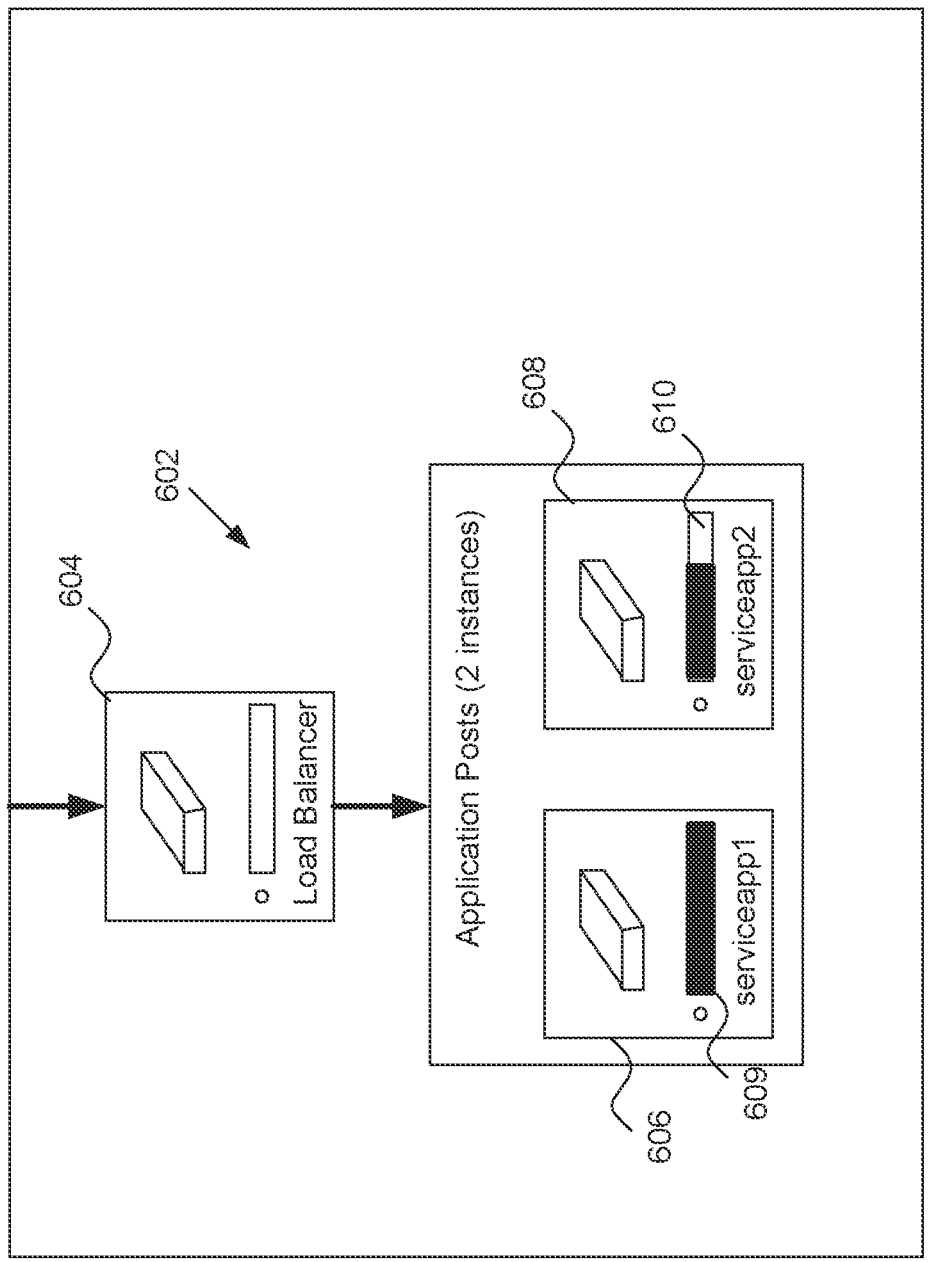
FIG. 6 is an example of a portion of a graphical user interface for graphically monitoring the deployment of an application.

FIG. 6 is an example of a portion of a graphical user interface (GUI) for graphically monitoring the deployment of an application in real time. In the present example, the topology requires a load balancer and two servers. Thus, the GUI illustrates a Directed Acyclic Graph (DAG) 602 comprising a load balancer node 604 and two server nodes 606 and 608.

The deployment of an application is a graph traversal algorithm. For example, in order to deploy the load balancer, the two servers must be deployed. As shown in the example of FIG. 6, a first server is deployed (as shown by a progress bar 609) and the second server is being deployed (as shown by a progress bar 610). Once the second server is deployed, the load balancer may then be deployed. Upon completion of deployment of the load balancer, the application is fully deployed.

The GUI for monitoring deployment may further comprise a table (not shown) of a job number of the deployment, task identifiers, tasks (e.g., deploy serverapp1, deploy serverapp2), status of the deployment (e.g., completed, in-_flight), results of the deployment (e.g., success, unknown), and percent of deployment completed (e.g., 1000%). Thus, the user may monitoring the deployment of the application in real-time.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 7:
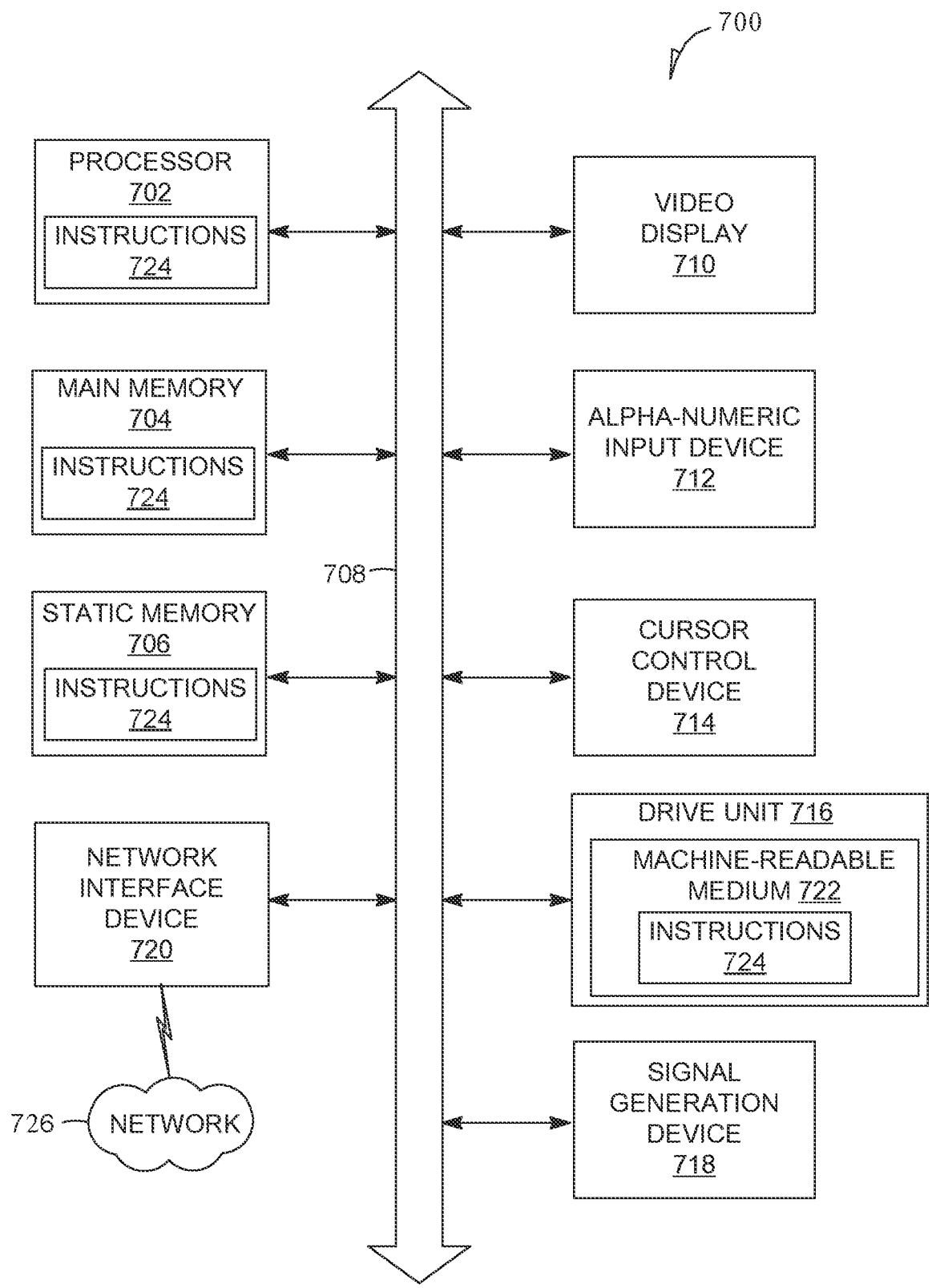
FIG. 7 is a simplified block diagram of a machine in an example form of a computing system within which a set of instructions for causing the machine to perform any one or more of the methodologies discussed herein may be executed.

With reference to FIG. 7, an exemplary embodiment extends to a machine in the exemplary form of a computer system 700 within which instructions for causing the machine to perform any one or more of the methodologies discussed herein may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In exemplary embodiments, the computer system 700 also includes one or more of an alpha-numeric input device 712 (e.g., a keyboard), a user interface (UI) navigation device or cursor control device 714 (e.g., a mouse), a touchscreen (not shown), a disk drive unit 716, a signal generation device 718 (e.g., a speaker), and a network interface device 720.

Machine-Readable Medium

The disk drive unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The machine-readable medium may also comprise non-transitory machine-readable medium.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method of managing deployment of an application in the cloud, the method comprising:
   receiving, by one or more hardware processors of a management system, a configuration associated with one or more computing resources;
   based on the configuration, initiating a deployment process to deploy the application to the one or more computing resources, the deployment being based on a graph comprising one or more nodes representing the one or more computing resources;
   monitoring progress of the deployment process to deploy the application to the one or more computing resources; and
   causing presentation of a display that indicates the progress of the deployment of the application to the one or more computing resources.

2. The method of claim 1, further comprising:
   causing display of a user interface for receiving the configuration.

3. The method of claim 1, wherein receiving the configuration comprises:
   receiving a selection of a predefined template; and
   receiving one or more edits to the predefined template, the one or more edits causing a change to the predefined template.

4. The method of claim 1, wherein receiving the configuration comprises receiving a selection of the one or more computing resources.

5. The method of claim 1, wherein the causing presentation of the display that indicates the progress of the deployment occurs in real-time during the deployment.

6. The method of claim 1, wherein the display that indicates the progress of the deployment comprises a table indicating a result of the deployment.

7. The method of claim 1, further comprising:
   triggering a roll back of the deployment.

8. The method of claim 1, wherein the computing resource comprises one or more of a server, pool, service, device, database, load balancer, or site.

9. A system of managing deployment of an application in the cloud, the system comprising:
   one or more hardware processors; and
   a memory storing instructions that when executed by the one or more hardware processors, cause the one or more hardware processors to perform operations comprising:
      receiving a configuration associated with one or more computing resources;
      based on the configuration, initiating a deployment process to deploy the application to the one or more computing resources, the deployment being based on a graph comprising one or more nodes representing the one or more computing resources;
      monitoring progress of the deployment process to deploy the application to the one or more computing resources; and
      causing presentation of a display that indicates the progress of the deployment of the application to the one or more computing resources.

10. The system of claim 9, wherein the operations further comprise:
    causing display of a user interface for receiving the configuration.

11. The system of claim 9, wherein receiving the configuration comprises:
    receiving a selection of a predefined template; and
    receiving one or more edits to the predefined template, the one or more edits causing a change to the predefined template.

12. The system of claim 9, wherein receiving the configuration comprises receiving a selection of the one or more computing resources.

13. The system of claim 9, wherein the causing presentation of the display that indicates the progress of the deployment occurs in real-time during the deployment.

14. The system of claim 9, wherein the display that indicates the progress of the deployment comprises a table indicating a result of the deployment.

15. The system of claim 9, wherein the operations further comprise:
    triggering a roll back of the deployment.

16. A non-transitory machine-storage medium storing instructions that when executed by one or more hardware processors of a machine, cause the machine to perform operations comprising:
    receiving a configuration associated with one or more computing resources;
    based on the configuration, initiating a deployment process to deploy the application to the one or more computing resources, the deployment being based on a graph comprising one or more nodes representing the one or more computing resources;
    monitoring progress of the deployment process to deploy the application to the one or more computing resources; and
    causing presentation of a display that indicates the progress of the deployment of the application to the one or more computing resources.

17. The non-transitory machine-storage medium of claim 16, wherein receiving the configuration comprises:
    receiving a selection of a predefined template; and
    receiving one or more edits to the predefined template, the one or more edits causing a change to the predefined template.

18. The non-transitory machine-storage medium of claim 16, wherein receiving the configuration comprises receiving a selection of the one or more computing resources.

19. The non-transitory machine-storage medium of claim 16, wherein the causing presentation of the display that indicates the progress of the deployment occurs in real-time during the deployment.

20. The non-transitory machine-storage medium of claim 16, wherein the operations further comprise:
    triggering a roll back of the deployment.

\* \* \* \* \*